United States Patent
Tanizawa et al.

(10) Patent No.: US 7,069,106 B2
(45) Date of Patent: Jun. 27, 2006

(54) SEQUENCE CIRCUIT DISPLAY METHOD OF INJECTION MOLDING MACHINE

(75) Inventors: Seiji Tanizawa, Aichi-ken (JP); Kazuyuki Osawa, Aichi-ken (JP); Shoji Okado, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 10/796,009

(22) Filed: Mar. 10, 2004

(65) Prior Publication Data

US 2004/0181293 A1    Sep. 16, 2004

(30) Foreign Application Priority Data

Mar. 10, 2003    (JP)    ............................. 2003-062987

(51) Int. Cl.
*G06F 19/00*    (2006.01)

(52) U.S. Cl. .................... 700/180; 700/80; 700/83; 700/200

(58) Field of Classification Search ................ 700/83, 700/86, 180, 200
See application file for complete search history.

(56) References Cited

U.S. PATENT DOCUMENTS

| | | | | |
|---|---|---|---|---|
| 5,801,942 A | * | 9/1998 | Nixon et al. | 700/83 |
| 6,272,398 B1 | * | 8/2001 | Osborne et al. | 700/245 |
| 6,649,095 B1 | * | 11/2003 | Buja | 264/40.6 |

FOREIGN PATENT DOCUMENTS

JP    06 91716    4/1994
JP    2002 036325    2/2002

OTHER PUBLICATIONS

"Yokogawa Electric FA-M3 PLC Ladder Monitor" Pro-Face Human Machine Interface. 2003, Digital Electronics Corporation.*

"TOYOPUC Circuit Monitor Function Unit" Operation Manual. Toyoda Machine Works, Ltd. 1999.*

* cited by examiner

Primary Examiner—Leo Picard
Assistant Examiner—Michael D. Masinick
(74) Attorney, Agent, or Firm—Browdy and Neimark, PLLC

(57) ABSTRACT

A sequence circuit display method for an injection molding machine which enables a sequence circuit corresponding to an operating step to be quickly displayed and enables the connection states of contacts, coils, etc. in a sequence circuit to be easily grasped when obtaining a grasp of the sequence circuit, comprising selectively inputting an operating step name in an injection molding machine from an input device to thereby display a sequence circuit including contacts, coils, etc. corresponding to the selected input operating step as a ladder diagram on a display device; comprising displaying a sequence circuit of an injection molding machine as a ladder diagram on a display device and selectively inputting one of the contacts, coils, etc. in the ladder diagram to thereby display a sequence circuit including contacts, coils, etc. corresponding to the selected input contact, coil, etc. as a ladder diagram on the display device; etc.

2 Claims, 3 Drawing Sheets

SEQUENCE CIRCUIT DISPLAY METHOD OF INJECTION MOLDING MACHINE

BACKGROUND OF THE INVENTION

1. Field of the Invention

The present invention relates to a sequence circuit display method for an injection molding machine displaying a sequence circuit in an injection molding machine used for molding a plastic material, metal material, etc. as a ladder diagram on a display device. More particularly, it relates to a sequence circuit display method for an injection molding machine displaying a sequence circuit including a contact, coil, etc. corresponding to a selectively input operating step name as a ladder diagram on a display device.

2. Description of the Related Art

As a method for displaying a sequence in an injection molding machine on a display screen, there is the one described in Japanese Patent Publication (A) No. 6-91716. Japanese Patent Publication (A) No. 6-91716 displays a graphic of the injection molding machine on a displaying means of the injection molding machine and moves that graphic to show the operation being executed in accordance with the progress in the sequential operation of one molding cycle of the injection molding machine so as to enable the operation being currently executed to be immediately grasped. Accordingly, Japanese Patent Publication (A) No. 6-91716, by making it easier to obtain a grasp of the operating step, helps finds the cause of any trouble or abnormalities occurring. However, Japanese Patent Publication (A) No. 6-91716 only displays the progress in the sequence by a graphic. It did not enable an individual grasp of the connection states or abnormalities of the contacts, coils, etc.

As a method for checking the sequence ladder program in an injection molding machine to deal with this problem, there is the method described in Japanese Patent Publication (A) No. 2002-36325. Japanese Patent Publication (A) No. 2002-36325 describes to display a list of names of input devices and/or output devices and display an ON state where the input/output device is electrically operating, an ON standby state where the input/output device is in a state where it is electrically operative, and an OFF standby state where the input/output device is in a state where it is electrically inoperative separately corresponding to the names of the input/output devices displayed on the list. However, Japanese Patent Publication (A) No. 2002-36325 only displays the ON state, ON standby state, and OFF standby state for the input/output devices displayed on the list. It does not enable a display of a sequence circuit, a grasp of the relationship of contacts, coils, etc. in the sequence circuit, and a grasp of the connection states.

SUMMARY OF THE INVENTION

An object of the present invention is to provide a sequence circuit display method for an injection molding machine which enables a sequence circuit corresponding to an operating step to be quickly displayed and enables the connection states of contacts, coils, etc. in a sequence circuit to be easily grasped when obtaining a grasp of the state of a sequence circuit in the injection molding machine.

To attain the above object, according to a first aspect of the present invention, there is provided a sequence circuit display method for an injection molding machine comprising selectively inputting an operating step name in an injection molding machine from an input device to thereby display a sequence circuit including contacts, coils, etc. corresponding to the selectively input operating step as a ladder diagram on a display device.

According to a second aspect of the present invention, there is provided a sequence circuit display method for an injection molding machine comprising displaying a sequence circuit of an injection molding machine as a ladder diagram on a display device and selectively inputting one of the contacts, coils, etc. in the ladder diagram to thereby display a sequence circuit including contacts, coils, etc. corresponding to the selectively input contact, coil, etc. as a ladder diagram on the display device.

Preferably, the display of contacts, coils, etc. of the ladder diagram in the display device comprises displaying operating step names in the injection molding machine.

Alternatively, the display of contacts, coils, etc. of the ladder diagram in the display device comprises selectively displaying one of an active display screen for displaying connection states of the contacts, coils, etc. along with operations of the injection molding machine in real time and a still display screen displaying the connection states of the contacts, coils, etc. at a certain point of time in operation of the injection molding machine.

Alternatively, the display of contacts, coils, etc. of the ladder diagram in the display device comprises displaying contacts, coils, etc. corresponding to a selectively input contact, coil, etc. and other contacts, coils, etc. differently in the display of the sequence circuit including contacts, coils, etc. corresponding to the selectively input contact, coil, etc.

According to a third aspect of the invention, there is provided a sequence circuit display method for an injection molding machine comprising displaying a sequence circuit in an injection molding machine as a ladder diagram on a display device, wherein by a contact selection instruction and coil search instruction for the contact in the ladder diagram being given, a sequence circuit including coils corresponding to the contact is displayed as a ladder diagram on the display device or wherein by a coil selection instruction and contact search instruction for the coil in the ladder diagram being given, a sequence circuit including contacts corresponding to the coil is displayed as a ladder diagram on the display device.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
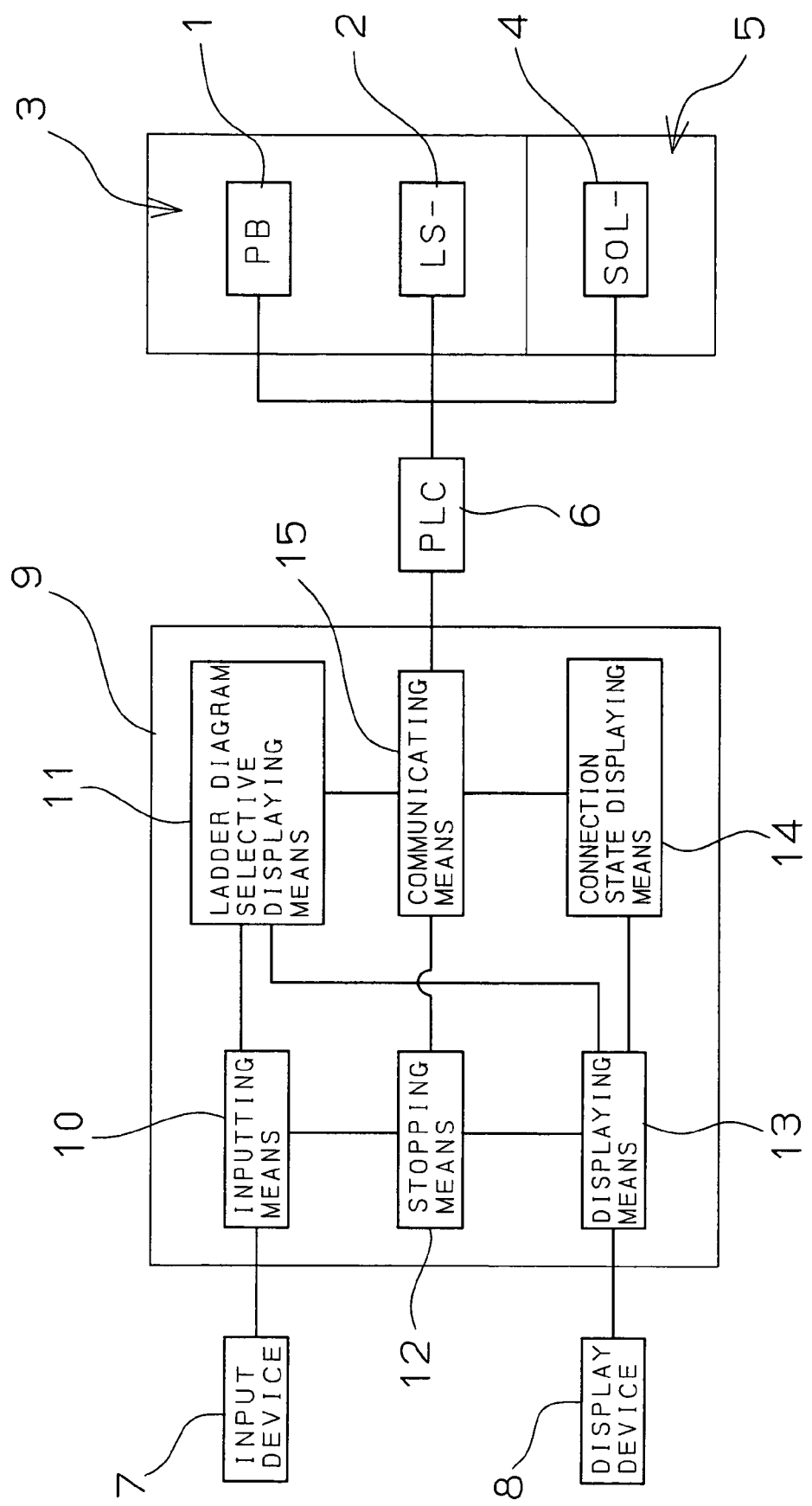
FIG. 1 is a block diagram of a display device used in a sequence circuit display method of an injection molding machine of the present invention.

Preferred embodiments of the present invention will be described in detail below while referring to the attached figures.

First, a block diagram of a sequence circuit display device of an injection molding machine of an embodiment of the present invention will be explained with reference to FIG. 1. The injection molding machine is provided with an input device 3 comprised of pushbutton switches 1 for inputting various types of molding conditions etc., limit switches 2 for turning on/off operation in accordance with the operation of the injection molding machine, and other sensors and an output device 5 comprised of solenoid valves 4 etc. for driving the injection molding machine. In a power servo type injection molding machine, the output device 5 is constituted by a servo amplifier, servo motor, etc.

The input device 3 and output device 5 are connected to a programmable logic controller (PLC) 6. The PCL 6 is a sequential controller which receives as input the signals from the input device 3 and outputs signals to the output device 5 in the operating steps of the injection molding machine and has the control of a sequence circuit comprised of contacts or coils. The hardware configuration of the PLC 6 includes a central processing unit (CPU), random access memory (RAM), read only memory (ROM), input/output (I/O) port, etc.

On the other hand, the injection molding machine is provided with an input device 7 comprised of a touch panel, keyboard, mouse, etc. and a display device 8 comprised of a cathode ray tube (CRT), liquid crystal panel, plasma display, etc. In this embodiment, the display device 8 is comprised of a liquid crystal panel. The liquid crystal panel is provided with the input device 7 constituted by a touch panel arranged in a multilayer structure. These are attached on a base at the stationary plate side of the injection molding machine (not shown).

In the block diagram of FIG. 1, a sequence circuit displaying means 9 is connected to the PLC 6, input device 7, and display device 8. In this embodiment, the sequence circuit displaying means 9 is constituted by a program stored in advance in the PLC 6, but it is also possible to attach a ROM etc. separately from the outside. The sequence circuit displaying means 9 is provided with an inputting means 10 for receiving signals input from the input device 7 and is provided with a ladder diagram selective displaying means 11 and stopping means 12 connected to the inputting means 10. Further, the sequence circuit displaying means 9 is provided with a displaying means 13 for outputting signals to the display device 8, while the displaying means 13 is connected to the ladder diagram selective displaying means 11, stopping means 12, and connection state displaying means 14. Further, the sequence circuit displaying means 9 is provided with a communicating means 15 for transferring signals with the PLC 6. The communicating means 15 is connected to the ladder diagram selective displaying means 11, stopping means 12, and connection state displaying means 14.

Figure 2:
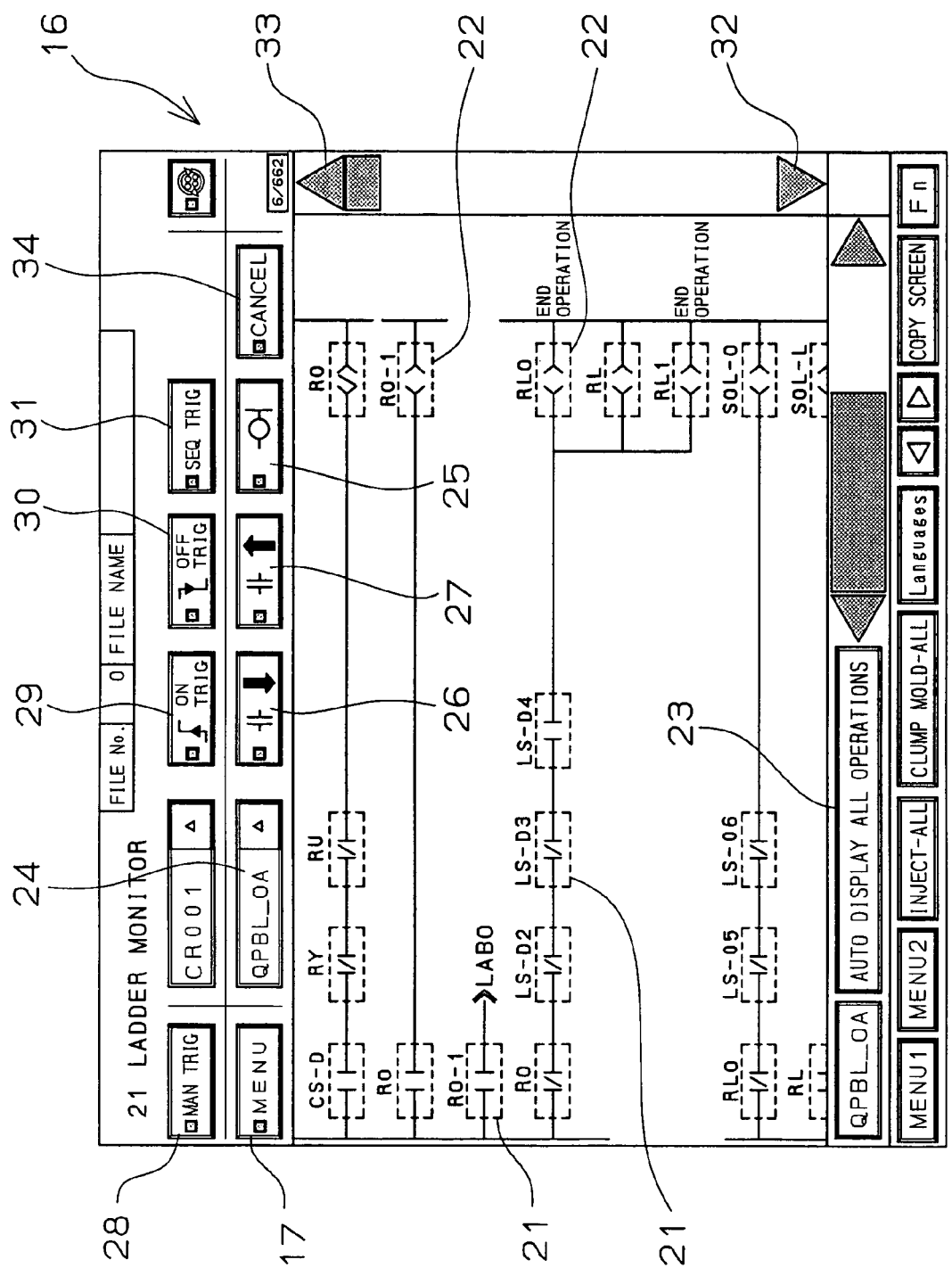
FIG. 2 is a view of a ladder monitor screen including contacts, coils, etc. used in the sequence circuit display method of an injection molding machine of the present invention.

Next, the sequence circuit display method using the sequence circuit display device for an injection molding machine of the present invention will be explained. At the time of molding by the injection molding machine, the display device 8 displays the molding conditions etc. When a worker operates the input device 7 constituted by the touch panel to selectively input a predetermined button, a signal is exchanged with the PLC 6 through the ladder diagram selective displaying means 11 and a ladder monitor screen 16 shown in FIG. 2 is displayed on the display device 8 constituted by the liquid crystal panel. The ladder monitor screen 16 displays the contacts or coils of the sequence circuit operating by the PLC 6 as a ladder diagram (ladder program).

In the ladder monitor screen 16, by selectively inputting a MENU button 17, a selective input screen (designated coil list window) 19 displaying CLOSE MOLD, ADVANCE EJECTOR, INJECT, and other operating step buttons 18 in parallel is displayed over on the ladder monitor screen 16. The worker selectively touches the operating step button 18 of the step where a problem has occurred or desired to be investigated and then touches an EXECUTE button 20. The selective input screen displaying the plurality of operating step names in parallel (designated coil list window) 19 then disappears, while the ladder monitor screen 16 (ladder program) of the sequence circuit including the coils corresponding to the operating step name selectively input by the ladder diagram selective displaying means 11 is displayed. Therefore, by selectively inputting one of the contacts or coils at the ladder diagram, it is possible to easily display the sequence circuit including the contacts or coils corresponding to the selectively input contact or coil as a ladder diagram on the display device.

Note that regarding which coil to jump to in the sequence circuit corresponding to the operating step name, by selecting one of the coils in the operating steps in advance among the operating steps, the sequence circuit including the selected specific coil (sequence circuit including specific coil across at least left and right bus bars) is jumped to. Note that in the above explanation, it is also possible to jump to a sequence circuit including a contact corresponding to the operating step name.

In this embodiment, the contacts or coils of the ladder monitor screen 16 are displayed on contact display boxes 21 and coil display boxes 22 not only as address numerals, but also as codes comprised of combinations of letters of the alphabet and numerals or letters of the alphabet identifying the operating steps in the injection molding machine. Therefore, it is easy to obtain a grasp of which operating step a contact or coil displayed on the ladder monitor screen 16 corresponds to. Further, the ladder monitor screen 16 is provided below it with a language display box 23. Further, the language display box 23 displays signal display comments of within 16 letters easy for a worker to understand when selectively inputting a coil or when selectively inputting the later mentioned contact as explained above. Note that in the present invention, the language displayed in the language display box 23 may be not only English, but also Japanese, Chinese, etc.

Further, as another method, by the worker touching a direct input button 24 at the ladder monitor screen 16 shown in FIG. 2, a plurality of contacts or points is newly displayed. If selectively touching one of the contacts or coils among them, it is possible to display the ladder monitor screen 16 of a sequence circuit containing that contact or coil. For example, if touching the direct input button 24 at FIG. 2 and selectively inputting the part where the contact "a" constituted by the LS-D3 is displayed, the ladder diagram of the sequence circuit including the contact "a" constituted by the LS-D3 is displayed. Note that at the ladder monitor screen 16, a timer is displayed as either the contact display box 21 or the coil display box 22.

Further, at the ladder monitor screen 16 shown in FIG. 2, if a worker touches one of the contact display boxes 21 in the displayed ladder diagram to give a contact selection instruction, then touches a coil search button 25 to give a coil search instruction, the ladder monitor screen 16 quickly jumps to the sequence circuit including the coil corresponding to the contact in the sense of the coil operating that contact and a ladder diagram including the coil is displayed on the liquid crystal panel of the display device 8. Further, if touching a coil display box 22 to give a coil selection instruction, then touching the coil search button 25 to give a coil search instruction, the ladder monitor screen 16 displays a ladder diagram of the sequence circuit including the coil corresponding to that coil in the sense that the same coil is used on the liquid crystal panel of the display device 8.

Further, at the ladder monitor screen 16 shown in FIG. 2, if the worker touches one of the contact display boxes 21 in the ladder diagram to give a contact selection instruction, then pushes a first contact search button 26, a ladder diagram corresponding to that contact is displayed at the liquid crystal panel of the display device 8 in the sense of the same contact below the currently displayed ladder diagram being used. Further, if touching one of the contact display boxes 22 in the ladder diagram to give a coil selection instruction, then pushing the first contact search button 26 to give a contact search instruction, the ladder monitor screen 16 quickly jumps to the sequence circuit including the contact corresponding to the coil in the sense of the contact operated by that coil, and a ladder diagram including the contact corresponding to the coil is displayed on the liquid crystal panel of the display device 8.

Further, at the ladder monitor screen 16 shown in FIG. 2, the worker selectively touches any of the contact display boxes 21 in the ladder diagram, then touches a second contact search button 27. The ladder monitor screen 16 then quickly jumps to the sequence circuit including the contact corresponding to the contact above the ladder diagram currently displayed, and the ladder diagram including that same contact is displayed on the liquid crystal display panel of the display device 8. Note that in the above, it is also possible to touch one of the coil search button 25, first contact search button 26, and second contact search button 27, then selectively touch one of the contact display boxes 21 or the coil display boxes 22.

Further, by using the above means to give a contact selection instruction and coil search instruction corresponding to that coil or give a coil selection instruction and contact search instruction corresponding to that contact, the sequence circuit including the corresponding contact or coil is jumped to and the ladder diagram is displayed on the ladder monitor screen 16. At this time, the contact display box 21 of the contact or the coil display box 22 of the coil corresponding to the selectively touched contact or coil can be displayed or viewed separately from the other contact display boxes 21 or coil display boxes 22. Therefore, if the contact or coil is selectively touch, it is possible to easily grasp what the corresponding contact or coil is. In the example of FIG. 2, the display box 21 blinks when the contact "a" constituted by LD-D3 (contact display) is selectively touched. The first contact or the jumped-to contact LS-D3 (contact display box) 21 differs from the other contact display boxes 21 or coil display boxes 22 and is displayed by the display code inverted black/white. Therefore, the selectively touched contact, coil, etc. is displayed separate from the other contacts or coils etc. both when the selection instruction is given or at the location jumped to.

In the sequence circuit display method for an injection molding machine of the present invention, by a signal being sent from the limit switches 2 or other contacts through the PLC 6 to the sequence circuit displaying means 9 and the signal being processed at the connection state displaying means 14, the ON/OFF connection states of the contacts, coils, etc. are displayed on the ladder monitor screen 16 of the display device 8 in accordance with the operating state of the injection molding machine. In the example of the ladder monitor screen 16 shown in FIG. 3, the contacts, coils, etc. with the ON connection states are displayed by red at the contact display boxes 21 and the coil display boxes 22, while the contacts or coils etc. with the OFF connection states are displayed by green, so the connection states of the contacts or coils etc. can be displayed and can be viewed at the display device 8.

Figure 3:
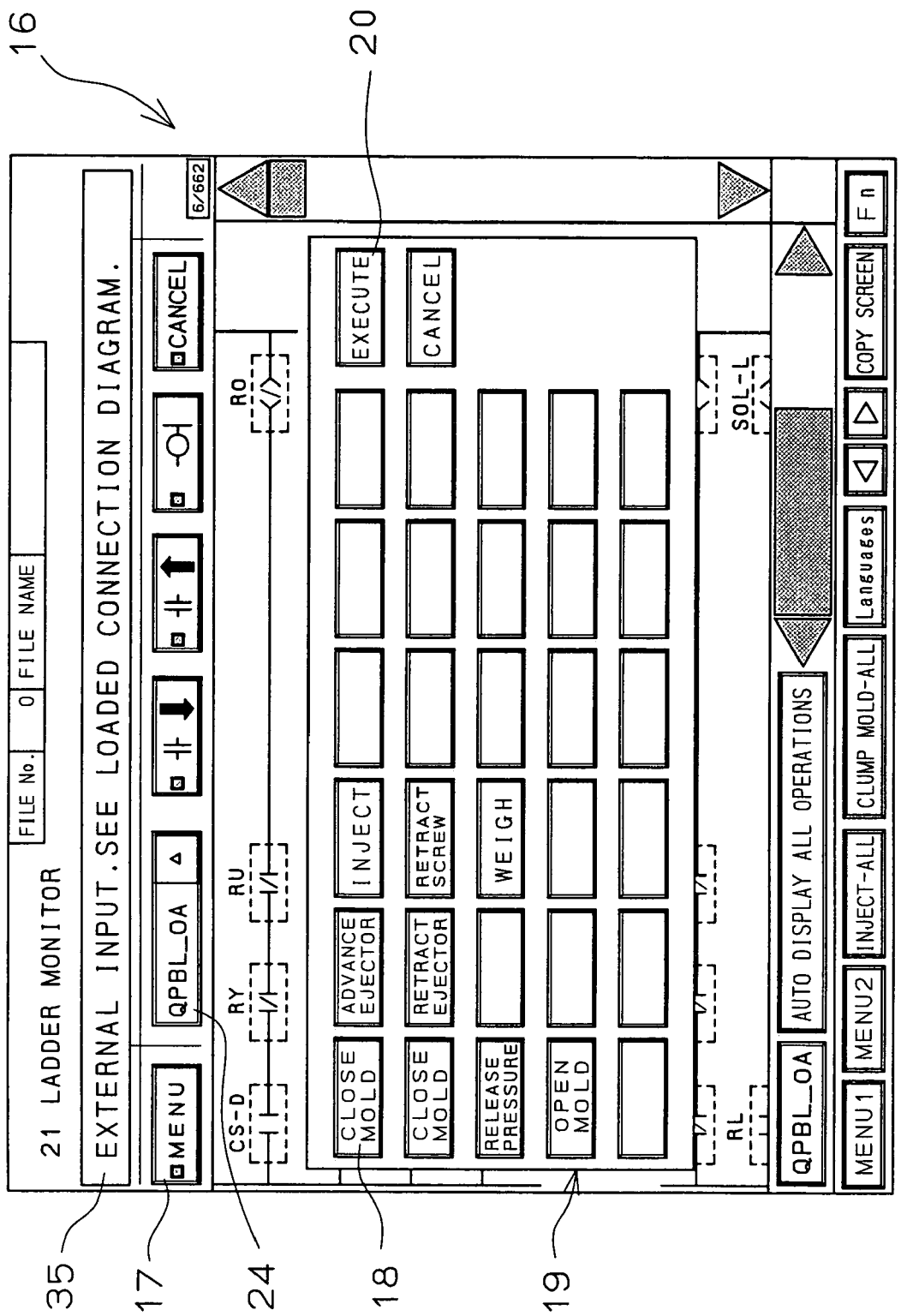
FIG. 3 is a view of a selective input screen for selective input of an operating step name of an injection molding machine used in the sequence circuit display method of an injection molding machine of the present invention.

In the sequence circuit display method for an injection molding machine, the stopping means 12 of the sequence circuit displaying means 9 can be used to selectively display either of an active display screen for displaying the connection states of contacts, coils, etc. of the injection molding machine in operation in real time and a still display screen for displaying a certain point of time in the injection molding machine in operation. In this embodiment, when the ladder monitor screen 16 shown in FIG. 3 is first displayed on the display device 8, the active display screen is displayed. Further, by touching one of a manual trigger button 28, ON trigger button 29, OFF trigger button 30, and sequence trigger button 31 shown in FIG. 2, the ladder monitor screen 16 is changed to the still display screen for a certain point of time of the injection molding machine during operation and the connection states of the contacts, coils, etc. at that point of time can be displayed and viewed.

For example, when a worker touches the manual trigger button 28, the connection states of the contacts, coils, etc. of the ladder diagram at that point of time can be displayed as a still display screen on the ladder monitor screen 16. Therefore, the worker can display the ladder diagram by both of the active display screen and the still display screen, so it is possible to stop at a part where a problem occurs. Further, after selectively touching a contact display box 21 or coil display box 22, if touching the ON trigger button 29 or OFF trigger button 30, the code display of the contact display box 21 or the coil display box 22 is inverted black/white. When contacts, coils, etc. turn on or off, the connection states of the contacts, coils, etc. of the ladder diagram can be displayed as a still display screen of the ladder monitor screen 16. Therefore, even when a worker is not always in front of the display device 8, the ladder monitor screen 16 is stopped by the specified contact, coil, etc. turning on or off and an abnormality of the connection state can be detected. Further, for the sequence trigger button 31, it is possible to set and input a trigger other than the manual trigger in the sequence. Further, the ladder monitor screen 16 changed to the still display screen by the trigger can be returned to the active display screen by the worker touching a CANCEL button 34.

At the ladder monitor screen 16, by selectively touching a scroll buttons 32 and 33, it is possible to scroll up and down the ladder diagram for display. Even when jumping to the corresponding contact, coil, etc., it is possible to return to the screen before the jump by selectively touching the CANCEL button 34.

Further, when searching for a coil corresponding to a contact by the coil search button 25 from a certain contact on the ladder monitor screen 16, if there is no coil corresponding to the contact, the part where the manual trigger button 28 etc. are displayed on the ladder monitor screen 16 is switched to a message display unit 35, the fact of being a limit switch 2 or other contact relating to an external input device 3 is displayed, and the method for dealing with it is simply explained. When there is no abnormality in the connection states of the contacts, coils, etc., the fact that communication is from the outside other than a PC such as an HMI or process controller may also be displayed on the message display unit 35 and a check other than the sequence circuit is instructed.

Therefore, the sequence circuit display method for an injection molding machine of the present invention enables remote control from a PC outside of a plant. Further, data of the ladder monitor screen 16 can be fetched and stored or printed out as bit map data. In this case, it is possible for a single PC to monitor a plurality of injection molding machines. It is also possible to use the ON trigger and OFF trigger functions etc. to determine an injection molding machine which has broken down.

While the invention has been described with reference to specific embodiments chosen for purpose of illustration, it should be apparent that numerous modifications could be made thereto by those skilled in the art without departing from the basic concept and scope of the invention.

What is claimed is:

1. A sequence circuit display method for an injection molding machine having contacts and coils for controlling operation of the molding machine, said method comprising selectively inputting a name of a step in the operation of the molding machine from an input device; displaying a sequence circuit of the injection molding machine as a ladder diagram on a display device; and selectively inputting one of the contacts and coils in said ladder diagram, the displayed sequence circuit including contacts and coils corresponding to the selectively inputted one of the contacts and coils as the ladder diagram on the display device, the contacts being displayed in contact display boxes and the coils being displayed in coil display boxes, wherein:

said step of displaying a sequence circuit including contacts and coils of said ladder diagram in said display device comprises:
preparing
an active display screen for displaying connection states of said contacts and coils along with operations of the injection molding machine in real time and a still display screen displaying the connection states of said contacts and coils at a certain point of time in operation of the injection molding machine; and selectively displaying one of the prepared screens, and said method further comprises:

displaying the active display screen, then touching a selected contact display box or coil display box and then touching an ON trigger button or an OFF trigger button in order to change to the still display screen and display the connection state of at least one of the contacts and coils corresponding to the selected contact or coil.

2. A sequence circuit display method for an injection molding machine having contacts and coils for controlling operation of the molding machine, said method comprising displaying a sequence circuit of the injection molding machine as a ladder diagram on a display device and selectively inputting one of the contacts and coils in said ladder diagram to thereby display a sequence circuit including contacts and coils corresponding to the selectively inputted one of the contacts and coils as the ladder diagram on the display device, wherein said display of contacts and coils of said ladder diagram in said display device comprises: preparing an active display screen for displaying connection states of said contacts and coils along with operations of the injection molding machine in real time and a still display screen displaying the connection states of said contacts and coils at a certain point of time in operation of the injection molding machine; and selectively displaying one of the prepared screens.

* * * * *